Figure 1:
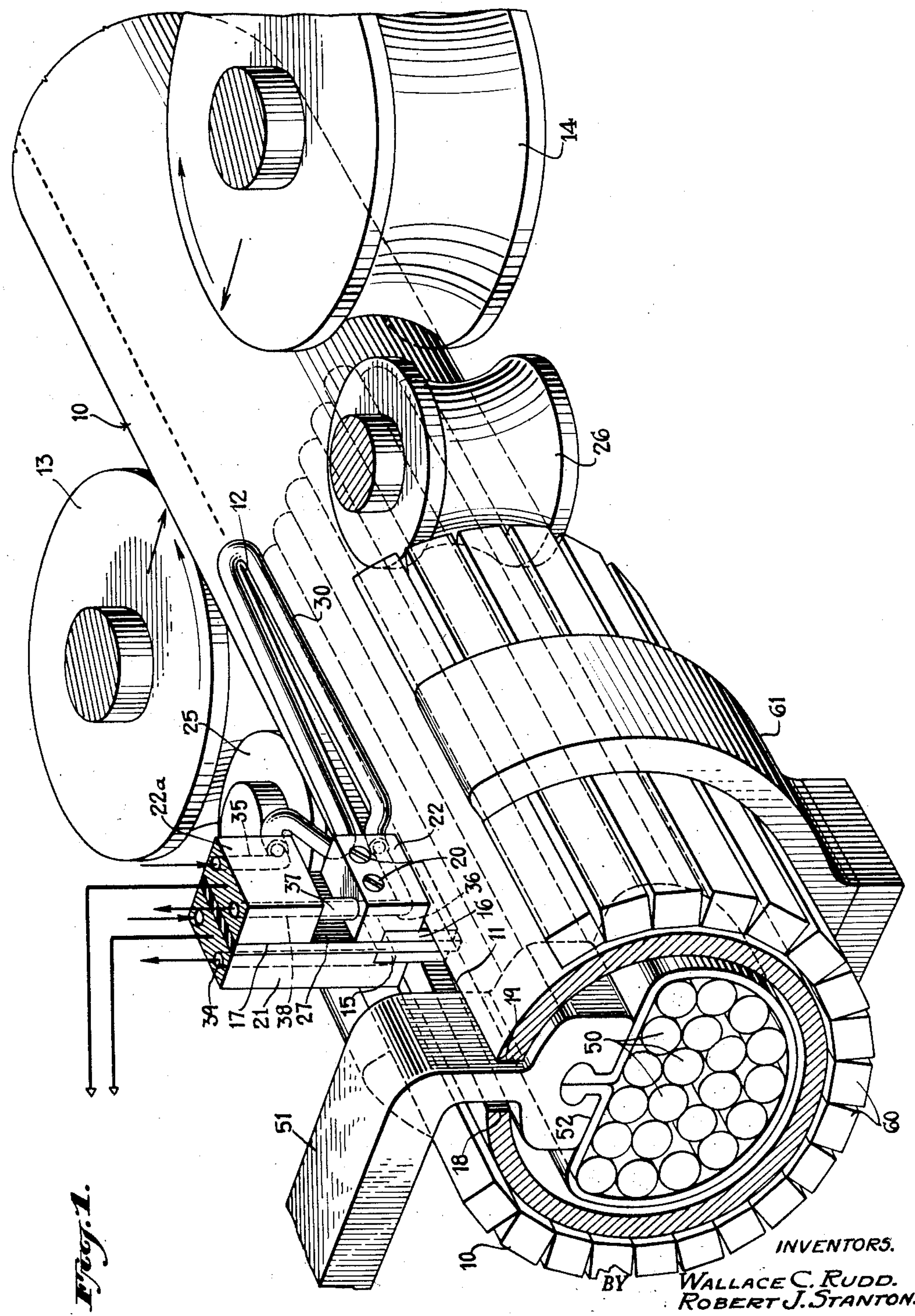

TUBE WELDING

Filed April 8, 1954 2 Sheets-Sheet 1

Ward, Neal, Haselton, Orme & McElhannon.
ATTORNEYS.

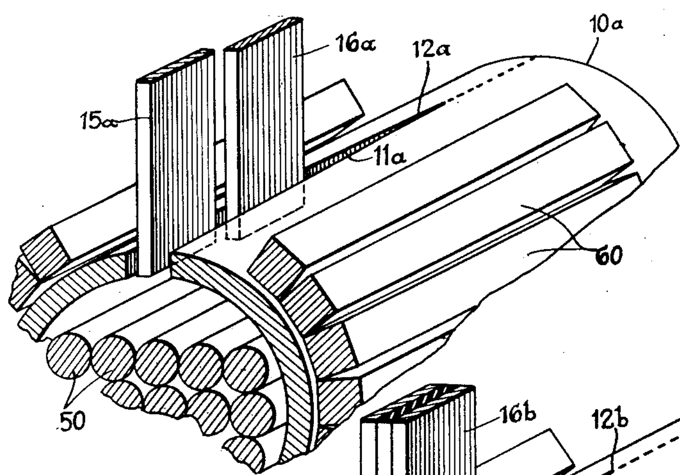
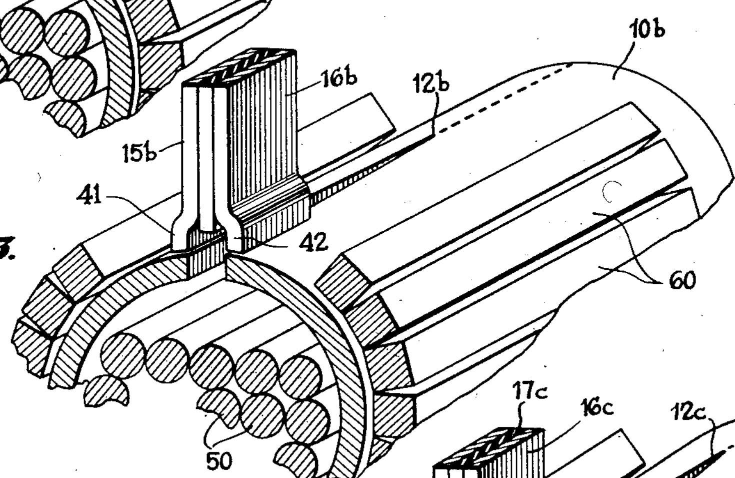
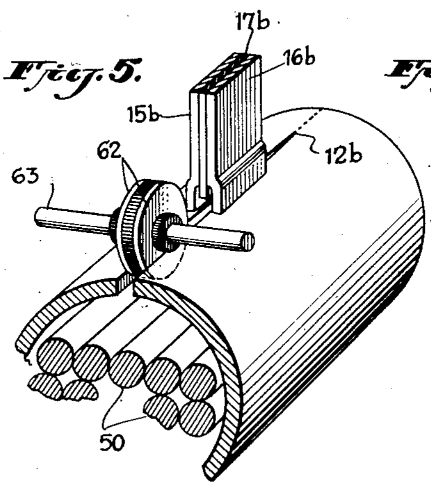
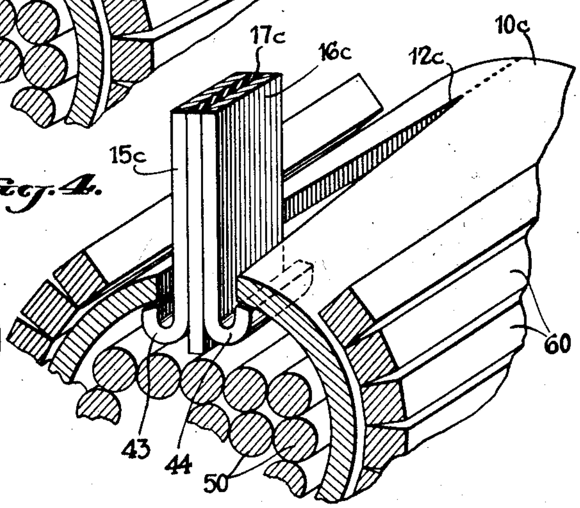
INVENTORS.
WALLACE C. RUDD.
ROBERT J. STANTON.
BY
Ward, Neal, Haselton, Orme & McElhannon
ATTORNEYS.

United States Patent Office 2,818,488

Patented Dec. 31, 1957

2,818,488

TUBE WELDING

Wallace C. Rudd, Larchmont, and Robert J. Stanton, Brooklyn, N. Y., assignors to Magnetic Heating Corp., New Rochelle, N. Y., a corporation of New York Application April 8, 1954, Serial No. 421,768

10 Claims. (Cl. 219—59)

This invention relates to methods and apparatus for welding elongated metal portions together, such for example as the opposed edges along a seam in metal tubing.

More particularly, this invention in its presently preferred embodiment herein disclosed, relates to the general method of forming metal tubing which comprises continuously advancing an initially flat strip of the metal while shaping the same into a tube having a gap or slit along one side, such tube then being subjected to heating and pressure by rollers to close the gap and to weld together the gap edges. Heretofore it has been common practice in the manufacture of steel tubing by this general method to weld the gap edges by electrical resistance heating, that is, a heavy current is applied by the use of contacts in the form of copper rollers which press heavily against the metal of the tube at either side of the gap so that the current passes from one of these rollers to the other directly across the gap at the weld point and also circumferentially around through the metal of the tubing. Alternating current is generally used of a frequency from about 60 to 180 cycles, or sometimes up to 300 cycles in case the tubing is advanced rapidly and it is desired to avoid noticeable indications of the current pulsations in the resulting weld structure. Since with such methods it is essential that very heavy currents pass through the tube metal rapidly to heat the whole body of same, it is also necessary to apply the contact rollers to the tubing with heavy pressure to insure good electrical contact, and while steel tubing is in the usual cases capable of withstanding such pressure, yet if the tubing is of softer nonferrous metal such for example as aluminum, or has thin walls, sufficient pressure cannot readily be applied by the rollers to insure the required good contact with the tubing without danger of deforming the latter. Accordingly, in order to weld thin-walled tubing or tubing of such softer metals, efforts have been made to use induction heating as by encircling the advancing tube at a point shortly prior to the point of welding with an induction heating coil. However, by this method it is difficult to induce sufficient current to flow in the tubing to rapidly heat the same, particularly if the tubing is of non-magnetic metal, because of the fact that the workpiece constituting the tubing is an open-sided cylinder, and also because there must be an appreciable radial distance between the surrounding coil and the tubing in order to have sufficient mechanical clearance for moving the tubing at high speed. This method of inductively heating the tubing by surrounding the same with a coil, although successful under various circumstances, is inefficient in that a substantial degree of heating occurs throughout the walls of the tubing including the portions opposite from the gap.

With the present invention the difficulties of both of the above described methods may be avoided by means and methods which essentially involve resistance heating of the tube edges just prior to the welding of the same together, by the use of radio frequency current, preferably of a frequency of the order of hundreds of thousands of cycles, so applied that the greater part of the current flow in the tubing metal is along a V-shaped path formed by the two opposite edges of the tubing metal as they are about to come together at the point of welding. This is preferably accomplished by supplying the heavy current at high frequency to a pair of contacts which respectively engage the opposite sides of the tube metal just shortly prior to the point where the edges at the gap are brought together. Such contacts may slidably engage respectively the opposite edge surfaces in the gap, although in some cases it may be preferred to use either sliding or rolling contacts which engage the outer surfaces, or possibly the inner surfaces of the tube close to and on opposite sides of the gap. Sliding contacts engaging respectively the opposed edge surfaces within the gap may in some cases be preferable because such surfaces during the previous steps in the process of forming the tube will have become accurately trimmed and will ordinarily be in smooth bright condition so that a good electrical contact may be secured therewith, and the contacts also may act in effect as spreaders against which pressure rollers at opposite sides of the tubing act to press the gap edges toward each other in proper relation for uniform welding.

With heavy current of the above-mentioned high frequency range and relatively low voltage applied in this way, for reasons explained below, the use of simple sliding contacts is made possible without arcing troubles and by far the major part of the current flow in the tubing metal will be confined to a path running from one of the sliding contacts along the one edge at the gap to the point of welding and back along the opposite edge to the other contact, and very little of the current will flow around the circumference of the tubing. The reason for this is that such high frequency current tends strongly to follow the lowest impedance path offered, and since radio frequency impedance is mainly inductive reactance, one may examine the paths of current flow basically from an inductance point of view. And since the edges of the tube gap which are about to be welded are quite close together, the radio frequency current along these edges will have a much lower impedance path than any currents which tend to flow circumferentially around the tubing.

Since for the above reasons by far the greater part of the radio frequency current flow in the tubing will be confined along the approaching edge surfaces of the V-shaped gap, it will be apparent that after such edge surfaces have passed the contacts, the temperature thereof will still continue to increase and that such temperature will reach a maximum just as the edges merge at the weld point. Thus it follows that the gap edges of the tube may approach the contacts and pass the same before being raised to a very high temperature, and hence high temperature difficulties at the contacts are avoided. Yet since the radio frequency current continues to flow along the V-shaped gap edges until they merge at the weld point, such edges may be heated to a softened condition ready for welding, without being injured or distorted by coming into contact when in such condition with any part of the apparatus, and at no time do the edges need to be brought up to the desired welding temperature until just at the moment and at the localized area where they are about to merge together. Thus the heating current may be utilized with exceptionally high efficiency, because no part of the tubing, except at the weld point, has to be heated to high temperature, and even at that point the highest temperature heating may be confined as to time, to substantially the moment of welding. On the other hand, if direct current or low frequency methods are used as above referred to, then heavy pressure rolling contacts are required and the current in following the lowest impedance path, will then largely follow lines of current flow in a plane or planes at the contacts and perpendicular to the axis of the tubing, and any minor part of the current which may tend to flow elsewhere, will be distributed through the mass of the metal of the tubing and hence not be effective for high temperature heating. Consequently the maximum temperature heating will be at or adjacent the contacts, rather than subsequently nearer the weld point.

In some cases, particularly if the tube diameter is relatively small, there will, however, be a tendency for at least a considerable part of the current to flow circumferentially around the tube instead of along the edges of the V-shaped gap and there may be a tendency for the weld point to vary its position along the direction of travel of the tube with consequent loss of efficiency and irregularities in the weld. We have discovered that these difficulties may be overcome in two ways by features which in fact supplement each other and make possible a surprising increase in the speed at which the tube may be advanced while still being welded with a high degree of uniformity. These features comprise first, the use of a conductor placed along above the edges to be heated and through which the radio frequency current is conducted in close proximity to the opposite edges and thereby substantially reducing the impedance of the radio frequency current path along such edges to and from the weld point. With the preferred construction above referred to, such conductor takes the form of a "hairpin" shaped portion placed along above the V-shaped gap. This hairpin conductor apparently so functions as to assist somewhat in maintaining the path of lowest inductance at a stabilized position, so that the weld point cannot move. Secondly, and more important, we have discovered that the impedance of the current path from one of the contacts circumferentially around the tubing to the other, may be greatly increased by mounting within the tubing and to some extent by mounting around just outside the tubing, magnetic core means of a suitable type, and the resulting increased impedance of this path causes the radio high frequency current still further to be concentrated where it is desired along the V-shaped gap edges. As a result, because of this second feature and with the use of a given amount of radio frequency current, the speed of the tubing may be increased 90 to 100% or more, using a given amount of power, while still making a uniform regular weld.

Various further and more specific objects, features and advantages of the invention will appear from the description given below taken in connection with the accompanying drawings illustrating by way of example certain preferred forms of the invention.

In the drawings:

Fig. 1 is a perspective view of the essential components of the apparatus of one embodiment of the invention and showing the position of a length of advancing tubing during the welding thereof; and Figs. 2 to 5 inclusive are perspective views of alternative forms of contact arrangements which may be used in practicing the invention.

Referring now to Fig. 1 in further detail, a length of tubing is shown at 10 continuously advancing from suitable apparatus which has acted to form a flat strip of metal into a tube having a gap 11 the opposed edge surface portions of which are brought together and welded at point 12. The equipment for preliminarily forming such tubing with two true straight and bright opposing edge surfaces at the gap 11 does not form a part of the present invention and accordingly is not shown in the drawings. Such apparatus may be of the types heretofore commonly used for shaping such tubes.

The edges at the gap 11 are brought together at the point 12 as the tube advances by the action of opposed pressure rollers such as indicated at 13, 14, which also may be constructed and operated in the same manner as in various well-known tube-welding machines.

A pair of contacts 15, 16, separated by a layer of high heat-resistant insulation 17, are mounted on any suitable supporting structure in positions respectively to slidably engage the opposed tube edge surfaces 18, 19 in the gap 11. These contacts may be formed of suitable metal alloys capable of withstanding high temperatures without corrosion, and also capable effectively of resisting abrasion.

Contacts 15, 16 may be detachably connected as by screws as shown at 20, to conductor bars 21, 22, respectively formed of copper or other good electrical conducting metal. These conductor bars are connected to a source of radio frequency current such for example as the output terminals of a radio frequency transformer designed to transform current from a high voltage high frequency source to a low voltage radio frequency heavy current, preferably of a frequency of from about 300,000 to 500,000 cycles per second. A much higher frequency up to some millions may be used if desired, although in the usual case a frequency of about 400,000 cycles will be ample.

The amount of current which is caused to flow in the circuit of the contacts 15, 16 may vary within considerable limits depending upon the size and thickness of the tubing and its speed of longitudinal movement, and of course the rate at which it is necessary to apply heat will increase in proportion with any increase in speed of the advance of the tubing, and the amount of heating required will be substantially greater if the tube walls are thicker. Sufficient current should be applied so that the edge surfaces of the metal within the gap 11 just as they come in contact at point 12 will be fused to weldable condition while the tubing metal spaced from such edge surfaces still remains solid and firm. Generally speaking, tubes of larger diameters will require substantially no more heating current than smaller tubes of the same wall thickness. This together with the fact that application of the preferred high frequency current requires no heavy contact pressure, are important advantages of the invention, enabling its use on tubes of a wide variety of sizes, shapes, strengths and of different metals.

If desired, additional rollers as at 25, 26 may be applied to the sides of the tube in a position to firmly press the edges 18, 19 at the gap into contact with the contact members 15, 16, respectively. These rollers should preferably be of insulation material or have insulated surfaces or supporting shafts.

With the particular embodiment of the invention shown in Fig. 1, the conductor bar 20 is shown interrupted by a gap 27 and above which conductor bar portion **22*a* extends on to its current connection. The purpose of this gap is to provide for connecting in series with the circuit the hairpin-shaped conductor portion shown at 30 which extends from bar portion 22*a* down to a point close to one edge of the gap 11, thence along such edge to a point above point 12. At the latter point this conductor portion is bent around to return along close to and just above the other edge of the gap 11 and thence into contact with conductor bar portion 22. The purpose of the conductor portion 30 in the position shown is as above explained to aid in concentrating the flow of current along the edges of the gap 11, by reason of what is sometimes referred to as the "proximity effect" in the induction heating art. That is, the use of the loop 30** acts to cause a current path through the weld point of a somewhat lower inductance than otherwise would occur, because of the proximity of the current carried in this loop.

It will be understood that with the particular construction shown in Fig. 1 the current flows from the source through the conductor bar portion **22*a*, thence through the hairpin-shaped conductor 30 into conductor bar portion 22 to contact 16, thence along one edge surface of the gap 11 to the region of the point 12 and back along the other edge surface in the gap to contact 15 and back to the current source through conductor bar 21**.

In view of the heavy current used, it will ordinarily be necessary or desirable to provide cooling means for the conductor bars 21, 22, 22*a*. This may be accomplished by forming these members with cavities as shown through which cooling fluid may be circulated. For example, in member 22*a* the fluid may be conducted through a cavity 35, thence through the hollow interior of conductor 30 to cavity 36 in conductor bar 22, thence through a tube of insulation material 37 into a cavity 38 in conductor bar 22*a*. The conductor bar 21 may be formed with a U-shaped cavity 39 for receiving the cooling fluid.

It will be understood that suitable insulation supporting and mounting means (not shown) may be provided for the conductor bars to rigidly retain the same in the positions shown or so as to be adjustable with respect to the weld point 12.

As shown in Fig. 2, the contacts as at 15*a* and 16*a* for applying the high frequency to the facing edges and the gap need not necessarily be in directly opposed relation, but may be offset one in advance of the other. This arrangement may be particularly desirable where it is possible to have a relatively short path of current flow from the contacts to and from the weld point and with a consequent possibility of having a narrower gap in the tube where the gap edges are to be heated, thus reducing the reactance of the current path.

In other cases, as shown in Fig. 3, if preferred the contacts as at 15*b*, 16*b* may be shaped at their lower ends as shown at 41, 42 so as to contact with the outer surface of the tube 10*b* along lines close to the gap edges. With this arrangement the gap may be made still narrower at the points of contact, thereby further minimizing the impedance of the path of current flow from the contacts, to and from the weld point. Further, as shown in Fig. 4, if desired the contacts as at 15*c*, 16*c* may be so arranged as to extend down through the gap and be provided with tip portions 43, 44 for engaging the interior surface of the tube at points along and close to the gap. This form may be preferred where the interior surfaces of the tube are so formed as to be uniform and bright for good contact, or where it is desired to insure adequate heating along the lower part of the gap edges when of relatively thick metal.

The construction shown in Fig. 5 may be the same as that of Fig. 3 except that here the contacts 15*b*, 16*b* are if desired brought closer to the weld point 12*b* and means as at 62 is provided within the tube gap in advance of the contacts for preventing the edges of the gap from prematurely or irregularly coming together. In cases where the contacts are not interposed between the gap edges, there may be some tendency for the gap edges to approach each other too soon after leaving the contacts and with only a slight angle therebetween, the angle being so slight that the weld point may tend to fluctuate back and forth somewhat longitudinally of the tube, thereby giving an irregular weld. This difficulty may be avoided by interposing the spacing or spreader means 62 just in advance of the contacts. The means 62 may comprise a pair of thin metal rotatable discs for example insulated from each other and from the shaft 63 carrying same. A suitable supporting structure (not shown) with bearings and which may be adjustable in position is of course provided for the shaft. Such a means may also be used in connection with the arrangements of each of the other figures.

It will be understood that with all of the forms of contacts as shown in Figs. 2–5 inclusive, suitable supporting structure and fluid cooling means may be provided similarly as in Fig. 1 and also, if desired, hairpin-like conductor portions such as shown at 30 in Fig. 1 may be used with the contacts of Figs. 2–5.

Reverting now to Fig. 1, the magnetic core means above referred to will now be described in further detail. Such means may, for example, comprise a plurality of rods as at 50 of magnetic material retained, tied or supported in any suitable way within the advancing tube, for example by means such as an insulation bracket 51 extending down through the gap 11 and of suitable shape to grip or secure in place an insulation band or the like as at 52 for embracing the rods 50. Such rods may for example be formed of sintered magnetic oxide, an insulation material, preferably of types now well known, which have a low loss factor and high volume resistivity, for example such as the material marketed under the name Ferramic by General Ceramic & Steatite Corp. However, this core means may be of other forms of material which will have a permeability (mu) greater than one, preferably substantially greater, and such that eddy current losses therein will be minimized. As shown, this magnetic core means preferably extends from a position beneath the contacts within the tube and to a region beneath or nearly beneath the weld point 12. As here shown, the magnetic core means substantially fills the space within the tube except for the region just beneath the gap 11 and the necessary clearance space along the tube walls, but in some cases it may be necessary only to provide such core means in a form which will have an arcuate cross-section and be positioned around close to the interior surfaces of the tube.

Such internal magnetic core means may be supplemented by rods or strips of like or similar magnetic material located around the outside surface of the tube in the form for example of rods as indicated at 60, held in place for instance as by an insulation bracket 61 suitably secured thereto. But generally the internal core means will be found to be much more effective than the external means.

With the internal Ferramic core means such as above referred to, it has been found possible to increase the inductance of the circumferential path from one contact 15 to the other contact 16 by as much as 8 to 10 times and with such core material having low resistivity, the losses of power are not appreciably increased beyond what will occur in the absence of such core means. As a consequence, the current flowing from the electrodes to and from the weld point along the V-gap edges will be increased enough so that, for example as found by one typical test, an aluminum tube 2″ in diameter and 81 mils in thickness, could be welded at the rate of 45 feet per minute, using current of a frequency of 400 kilocycles from a 20 kw. generator, whereas without the core means but under conditions otherwise the same, the tubing could be advanced and properly welded only at rates up to about 24 feet per minute. In the above described test the parts were so arranged that the distance between the weld point and the trailing edges of the contacts was about ¾″. It has been found that this distance is preferably somewhat less in welding non-ferrous tubing. In a similar test in welding steel tubing, such distance was preferably about 2¼″. In a typical test with steel tubing, using a current of a frequency of 375 kilocycles from a 20 kw. generator, it was found that the tubing could be welded at a speed of over 50 feet per minute the tubing being 2″ in diameter and its walls being of a thickness of 0.052″. There was no objectionable upset ridge or other irregularity formed along the line of the weld. Of course, with more powerful radio frequency generators, the above noted welding speeds may be greatly increased. One of the important advantages of the invention is that the larger radio frequency generators for high speed welding are very much less expensive than low frequency generators having the necessary power and heretofore used for tube welding. A further advantage is that with the contact arrangements here shown, the machine can be set up and adjusted for different sizes of tubing within a few minutes as contrasted with many hours required with prior apparatus.

It should be noted that the magnetic core means as used in the combination here described, performs a quite different function from that of magnetic core means as sometimes heretofore used in connection with the induction heating of tubing and where an induction heating coil is positioned around the tube. In that case, the addition of the core increases the total magnetic flux produced by the coil, which in turn increases the total current circulating circumferentially in the tube by reason of induction as distinguished from the resistance heating method of the present invention. In the present case, the situation with a magnetic core is in fact quite the opposite of that with such induction heating methods, because with the latter the effect is greatly to increase the current flow around within the tubing areas opposite from the gap, whereas with the present invention, the core greatly reduces the current in the tubing in directions around the tubing and compels the great majority of the current to follow the useful path from the contacts to and from the weld point.

In addition to the above-indicated advantages of the method of this invention when radio frequency current is used, there are various other important benefits arising from the following facts. The amount of radio frequency power required is a function of the thickness of the metal of the tube and largely independent of the tube diameter. Thus substantially no more power is required for welding large tubes as compared with small diameter tubes, this result occurring by reason of the fact that the heating is confined to the very edges which are to be welded. This is contrary to induction methods, where the larger the diameter of the tube, the greater the power supply must be, because in any event with induction methods, a considerable part of the heating effect is distributed in regions away from the gap edge surfaces. Substantially less power is required by our preferred methods than with induction methods, regardless of the diameter of the tubing being welded, because with induction methods, there is no way in which the maximum heating may be concentrated at the weld point, whereas by the method of this invention, that is the only point which needs to be brought up to actual welding temperature.

The preferred methods of this invention have the further advantage in that only a single pair of contacts is needed and yet the heating effect accomplished therewith is fully effective all along the edges of the V-shaped gap from the contacts clear to the weld point where the temperature becomes the maximum. On the other hand, with low frequency methods, if heavy currents are to be applied across the gap, either heavy rollers of high conductivity applying great pressure have to be used, or a plurality of pairs of such rollers, each of which can only cause momentary heating with a chance for the tube even to cool following each pair and with no chance for a sustained and increased heating of the gap edges after they have left the contacts.

The greatest advantages of the present preferred methods occur both with ferrous and non-ferrous relatively thin-walled tubing of types which cannot withstand the heavy contact pressures required to apply the strong heating current necessary for the prior resistance heating methods, especially if the tubing is to be advanced at high speed for economical production.

Once having set up the apparatus to make tubing of given dimensions and with contacts at the gap edges located a given distance from the weld point, one may determine a suitable frequency which will cause the current to follow the desired path according to the invention, by mathematical computations, or a suitable frequency may readily be determined by brief tests. Frequencies in the neighborhood of 100,000 cycles, are suitable so far as the invention is concerned, although same may involve at present some practical difficulties in that this range falls between the higher frequency range of motor-driven generators and the lower ranges economically most practical for vacuum tube radio frequency generators. Accordingly, as indicated above, frequencies of the order of hundreds of thousands of cycles or higher are at present preferable in practice. Same may be easily and economically achieved with vacuum tube generators.

This application is a continuation in part of our copending application Serial No. 332,422, filed January 21, 1953, and which discloses apparatus the same as disclosed in Figs. 1–4 herein, except without the magnetic core material within and about the tubing.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patents is:

1. Method for welding together the edges of a longitudinal gap in metal tubing which comprises longitudinally advancing the tubing while subjecting the same to pressure from opposite sides thereof to bring the gap edges together at a welding point as a narrow V-shaped formation, and while heating said edges to welding temperature by applying contacts connected to means providing a source of high frequency current, to points on the tubing at opposite sides of the gap at a position shortly in advance of said point, said current being of a sufficient frequency whereby the greater part of the current flowing in the tubing metal from one contact to the other will follow a path from one of said contacts along close to one edge of the gap to said welding point and back along close to the opposite edge of the gap to the other contact, and also conducting such current along and just above said V formation, to decrease the reactance of said path.

2. Apparatus for welding together the edges of a longitudinal gap in metal tubing, which comprises means for longitudinally advancing the tubing while subjecting the same to pressure at opposite sides of the gap to bring such edges together at a welding point in a narrow V-shaped formation, a pair of contacts mounted respectively to be slidably engaged by surfaces of the metal of the tubing along opposite sides of the gap at a position shortly in advance of said point, means for connecting a source of high frequency current to said contacts, and a conductor member of a generally corresponding V-shape mounted along just above the position of said gap in advance of said point, said conductor member being connected in series with the connection from said source to one of said contacts.

3. Apparatus for welding together the edges of a longitudinal gap in metal tubing, which comprises means for longitudinally advancing the tubing while subjecting the same to pressure at opposite sides of the gap to bring such edges together at a welding point in a narrow V-shaped formation, a pair of contacts mounted respectively to be slidably engaged by the opposite edge surfaces of the metal of the tubing within the gap at a position shortly in advance of said point, a source of high frequency current connected to said contacts, and a conductor member of a generally corresponding V-shape mounted along just above the position of said gap in advance of said point, said conductor member being connected in series with the connection from said source to one of said contacts.

4. Apparatus for welding together the edges of a longitudinal gap in metal tubing, which comprises means for longitudinally advancing the tubing while subjecting the same to pressure at opposite sides of the gap to bring such edges together at a welding point in a narrow V- shaped formation, a pair of contacts mounted respectively to be engaged by surface of the metal of the tubing at opposite sides of the gap at a position shortly in advance of said point, means for connecting a source of high frequency current to said contacts, and a conductor member of a generally corresponding V-shape mounted along just above the position of said gap in advance of said point, said conductor member being connected in series with the connection from said source to one of said contacts.

5. Apparatus for welding together the edges of a longitudinal gap in metal tubing comprising in combination: means for longitudinally advancing the tubing while subjecting same to pressure at opposite sides of the gap to bring such edges together at a welding point in a narrow V-shaped formation; a pair of contacts mounted respectively to be engaged by surfaces of the metal of the tubing at or adjacent opposite sides of the gap and at a position shortly in advance of said point; a source of electrical current of a frequency of the order of 100,000 cycles per second or higher and having its terminals respectively connected to said contacts whereby such current will follow a path from one of said contacts along one edge of the gap to said welding point and back along on the opposite edge of the gap to the other contact; core means; and means for mounting same inside the tubing adjacent tubing surface areas at the region of other paths of current flow from said contacts circumferentially of the tubing, for increasing the reactance of such other current paths and thereby to increase the current flow along the edge surfaces of said gap, such core means comprising a magnetic but substantially an insulating body having a low loss factor, high volume resistivity and magnetic permeability substantially greater than unity.

6. Apparatus for welding together the edges of a longitudinal gap in metal tubing comprising in combination: means for longitudinally advancing the tubing while subjecting same to pressure at opposite sides of the gap to bring such edges together at a welding point in a narrow V-shaped formation; a pair of contacts mounted respectively to be engaged by surfaces of the metal of the tubing at or adjacent opposite sides of the gap and at a position shortly in advance of said point; a source of electrical current of a frequency of the order of 100,000 cycles per second or higher and having its terminals respectively connected to said contacts whereby such current will follow a path from one of said contacts along one edge of the gap to said welding point and back along on the opposite edge of the gap to the other contact; and core means and means for mounting same inside the tubing adjacent tubing surface areas at the region of other paths of current flow from said contacts circumferentially of the tubing, for increasing the reactance of such other current paths and thereby to increase the current flow along the edge surfaces of said V-shaped gap, such core means comprising a sintered magnetic oxide insulating material having a low loss factor and high volume resistivity and magnetic permeability substantially greater than unity.

7. Method for welding a seam extending along opposed edges of two elongated metal portions, which comprises: rapidly advancing said portions with their said edges passing along the line of the desired seam and past a weld point; firmly retaining said edges together as they reach the region of said weld point; maintaining on said edges over a distance substantially in advance of said weld point, flows of electrical current of a frequency of the order of 100,000 cycles per second or higher for progressively heating such edges up to welding temperature upon reaching said point; and increasing the reactance of current paths in the metal spaced from the line of the desired seam by maintaining adjacent such current paths a body or bodies of magnetic but substantially insulating material having a low loss factor, high volume resistivity and magnetic permeability substantially greater than unity, whereby the resulting increased reactance of said paths increases the current flow along on said edges.

8. Apparatus for welding a seam along opposed edges of two elongated metal portions which comprises: means for rapidly advancing said portions with their edges passing along the line of the desired seam and past the weld point; a source of electrical heating current of a high frequency of the order of 100,000 cycles per second or higher; a pair of contacts positioned respectively to be engaged by said edges at or adjacent the line of the desired seam shortly in advance of said point; and connections for connecting the terminals of said source respectively to said contacts, whereby such current will follow a path from one of said contacts along on one of said edges to the weld point and back along the other edge to the other contact, and one of said connections including a generally hairpin-shaped portion which extends from one of said contacts along just above the position of said line to the weld point and back to a location close to the other contact, thereby to reduce the reactance of the paths of said current on said edges and thus acting to cause concentration of the current along on said edges.

9. Apparatus for welding a seam along opposed edges of two elongated metal portions which comprises: means for rapidly advancing said portions with their edges passing along the line of the desired seam and past the weld point; a source of electrical heating current of a high frequency of the order of 100,000 cycles per second or higher; and contact means for applying said current to flow along said edges for a substantial distance in advance of the weld point for progressively heating such edges up to welding temperature upon reaching said point, fluid-cooled connections being provided between the terminals of said source and said contacts respectively, one of said connections including portions which extend along in closely spaced relation to the paths of said current flowing on said edges, such connection portions acting to decrease the reactance of said current paths and thereby acting to cause concentration of the current along on said edges.

10. Apparatus for welding together the edges of a longitudinal gap in metal tubing comprising in combination: means for longitudinally advancing the tubing while subjecting same to pressure at opposite sides of the gap to bring such edges together at a welding point in a narrow V-shaped formation; a pair of contacts positioned respectively to be slidably engaged by surfaces of the metal of the tubing at or adjacent opposite sides of the gap and at a position shortly in advance of said point said contacts being formed of abrasion and high temperature resistant metal; a pair of metal supports for said contacts respectively insulated from each other and formed with fluid-cooling cavities located in positions for close heat transfer relationship to said contacts; a source of electrical current of a frequency of the order of 100,000 cycles per second or higher, and connections from said source to said supports respectively whereby such current will follow a path from one of said contacts along on one edge surface of the gap to said welding point and back along on the opposite edge surface of the gap to the other contact.

References Cited in the file of this patent

UNITED STATES PATENTS

| | | |
|---|---|---|
| 403,157 | Thomson | May 14, 1889 |
| 2,020,276 | Crawford | Nov. 5, 1935 |
| 2,139,211 | Sessions | Dec. 6, 1938 |